United States Patent [19]
Rion et al.

[11] Patent Number: 5,853,190
[45] Date of Patent: Dec. 29, 1998

[54] FASTENERLESS DRIVER AIR BAG COVER AND EASY TO ASSEMBLE AIR BAG MODULE ASSEMBLY

[75] Inventors: Robert B. Rion, Livonia; Gregory N. Goestenkors, Waterford; David B. Figlioli, Clinton Township, Macomb County, all of Mich.

[73] Assignee: Breed Automotive Technology, Inc., Lakeland, Fla.

[21] Appl. No.: 864,978

[22] Filed: May 28, 1997

[51] Int. Cl.⁶ ................................................. B60R 21/20
[52] U.S. Cl. ........................................ 280/728.2; 280/731
[58] Field of Search .............................. 280/728.2, 730.2, 280/731

[56] References Cited

U.S. PATENT DOCUMENTS

| | | | |
|---|---|---|---|
| 5,333,897 | 8/1994 | Landis et al. | 280/728.2 |
| 5,584,501 | 12/1996 | Walters | 280/728.2 |
| 5,590,900 | 1/1997 | Duran et al. | 280/728.2 |
| 5,620,201 | 4/1997 | Ricks | 280/728.2 |

*Primary Examiner*—Kenneth R. Rice
*Attorney, Agent, or Firm*—Markell Seitzman

[57] ABSTRACT

The present invention provides an air bag module (10) having a housing (24) with at least one connector (46a) and a cover (12) having a side wall (14) which surrounds the housing (24) to form a cavity between the panels for placement of an air bag and inflator therein. The cover (12) has at least one engagement member (56a) configured to operatively engage the connector (46a) of the housing (24) to secure the cover and housing to each other.

18 Claims, 4 Drawing Sheets

FASTENERLESS DRIVER AIR BAG COVER AND EASY TO ASSEMBLE AIR BAG MODULE ASSEMBLY

BACKGROUND AND SUMMARY OF THE INVENTION

The present invention generally relates to air bag modules and the assembly thereof.

Air bag modules and particularly those used for driver side air bag modules include a cover joined to a housing. The housing includes holes, slots and other apertures for receiving fasteners, such as brackets, rivets, screws, and bolts, for securing the cover to the housing. Such air bag covers have added costs associated with the brackets or fasteners and with the additional precautions that must be taken to ensure that stray fasteners have not migrated into the cushion of the air bag module. Additionally, the mounting of an air bag module assembly to a steering wheel frame during the manufacture of the vehicle is a labor intensive process. At least two fasteners are typically required to mount the air bag module assembly to the steering wheel frame.

It is an object of the present invention to provide an improved air bag module which does not require any screw or rivet type fasteners to secure the cover to the housing.

Further, it is an object of the invention to provide an easy to assemble air bag module assembly.

It is a further object of the invention to provide an air bag module assembly which requires minimal labor to mount it to the steering wheel during the manufacture of the vehicle.

Accordingly, the present invention comprises an air bag cover mounted to a housing. The cover includes a side wall which surrounds the housing cooperating to form a cavity for placement of an air bag and inflator therein. The cover has at least one engagement member configured to operatively engage a cooperating feature of the housing to secure the cover and housing to each other.

The engagement member is joined to the cooperating feature to secure the housing to the over to form a cavity for the air bag and inflator.

The present invention also includes a method of assembling an air bag module assembly. The method comprises the steps of providing a housing having at least one connecting feature for engaging a cover having a side wall and at least one engagement member for engaging the connecting feature; securing an air bag and inflator to the housing; bringing the housing in proximity to the cover and facilitating the connection of the feature to the engagement member.

Many other objects and purposes of the invention will be clear from the following detailed description of the drawings.

DETAILED DESCRIPTION OF THE DRAWINGS

Figure 1:
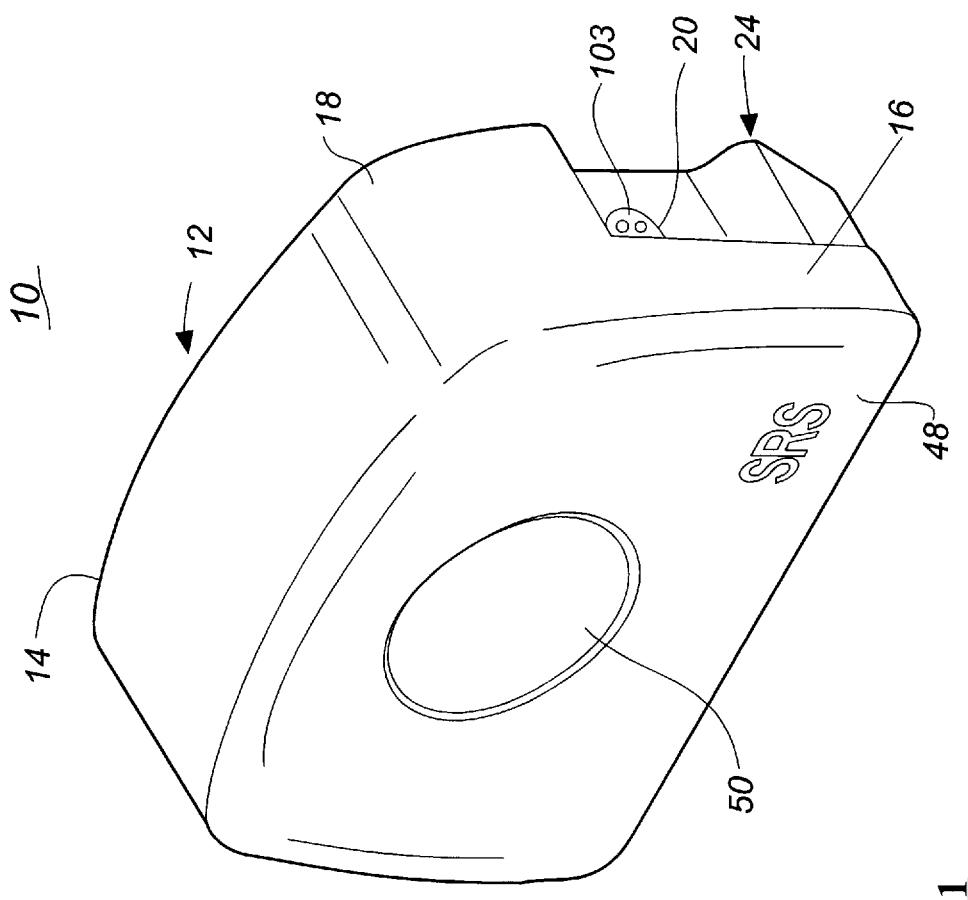
FIG. 1 is a perspective view of an air bag cover according to the present invention.

With reference to FIG. 1 there is shown a perspective view of the major components of an assembled air bag module 10 having a housing 24 nested within a cover 12. The cover 12 further includes side walls 14 and 16. The top portion 18 of side wall 14 is arcuately shaped. In a preferred embodiment of the invention the air bag module assembly 10 is a driver side air bag module assembly, however, the invention is applicable to other assemblies and air bags such as those used on the passenger side or for side impact protection.

Figure 2:
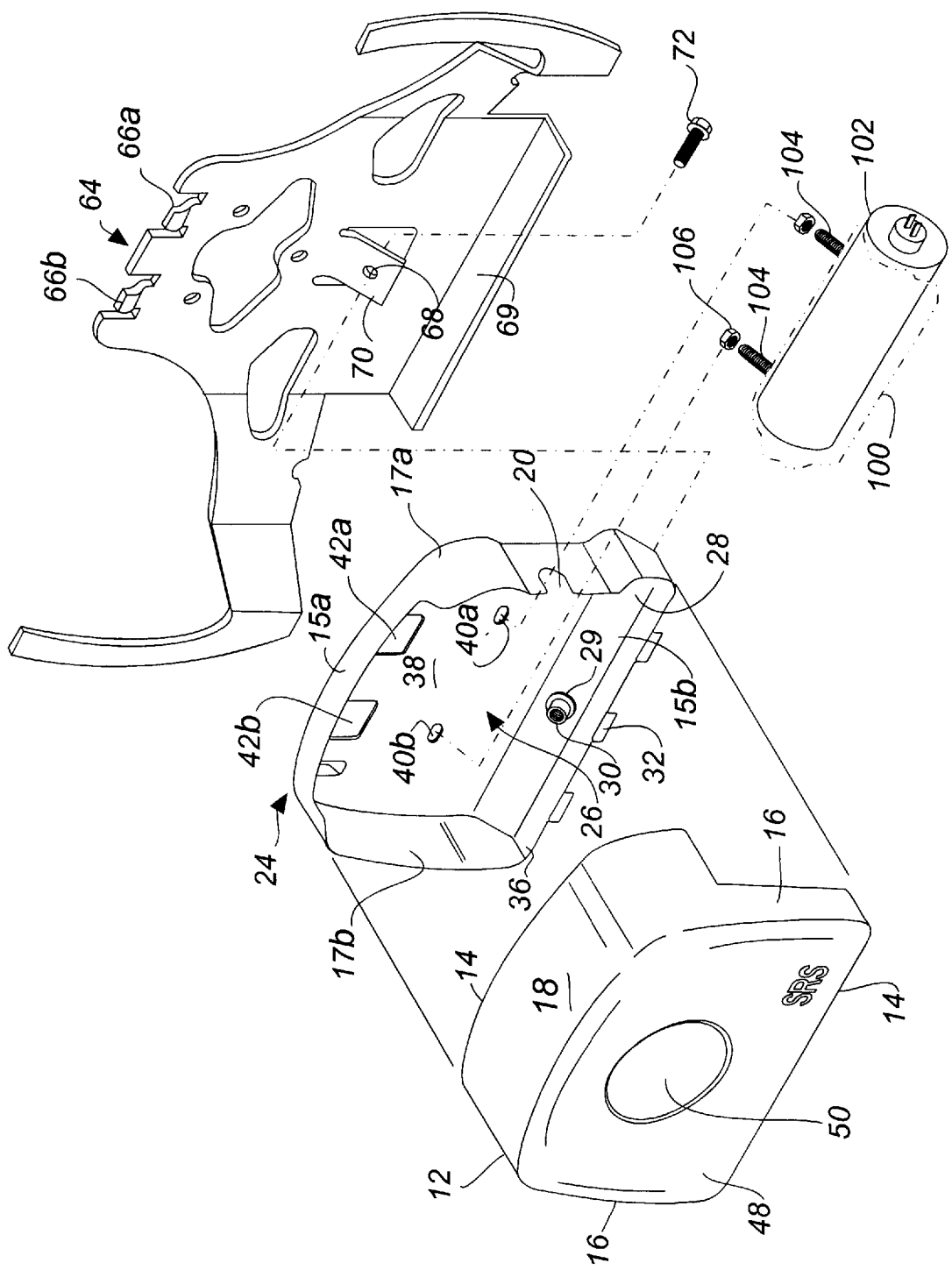
FIG. 2 is an assembly view of an air bag module.

FIG. 2 is an assembly view of the module and shows the air bag cover 12 spaced from the housing 24. The cover and housing when joined together form a cavity 26 therebetween within which are located the air bag 100 and inflator 102. The inflator 102 includes a narrow diameter circular end boss 103 and a plurality of extended bolts 104 that are received within oval openings 40a,b in the housing and secured thereto by a like plurality of nuts 106. An electrical connector 105 is positioned in the end boss 105. The air bag 100 is shown in phantom lines for ease of illustration. As is known in the art, the air bag is attached to the inflator, folded and located under the cover 12. One such air bag includes extending flaps proximate a neck portion, with the flaps placed in an overlapping configuration about the inflator bolts. This type of installation is illustrated and described by U.S. Pat. No. 5,516,146 issued on May 14, 1996 to Kopitzke, the contents of which are incorporated herein by reference.

Figure 6:
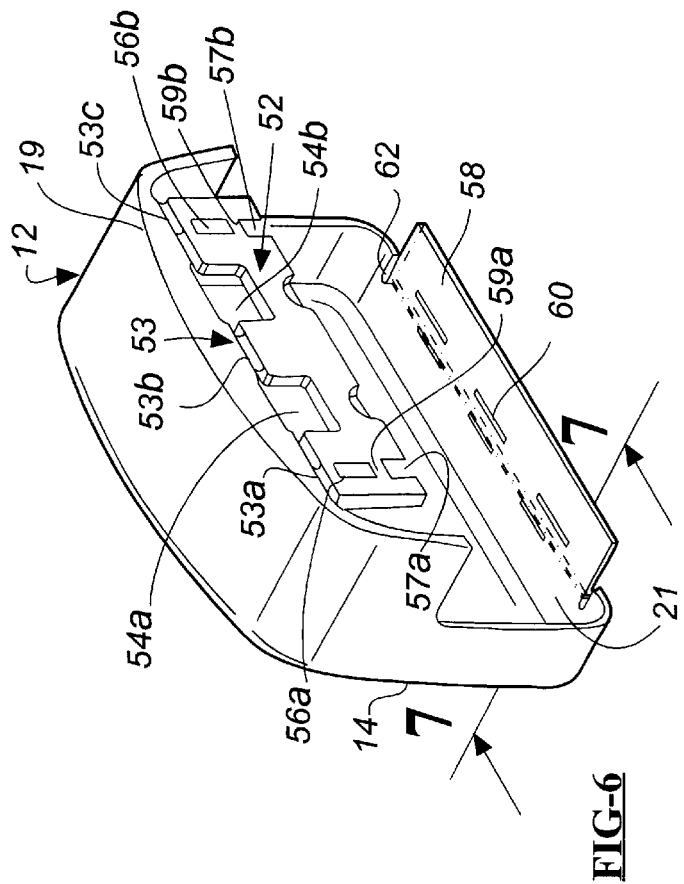
FIG. 6 is a rear perspective view of the cover air bag of FIG. 2.
Figure 7:
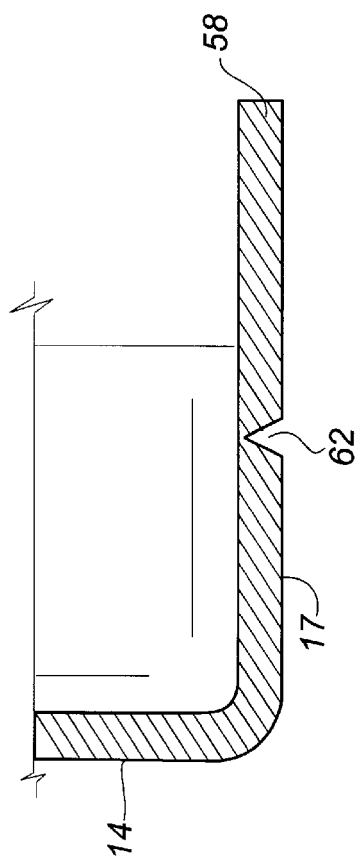
FIG. 7 is a cross-sectional view of the cover air bag of FIG. 2 along section lines 7—7 of FIG. 6.

The cover 12 may be formed of a thermoplastic material and housing 24 may be formed of a metallic alloy or plastic. With reference to FIGS. 2 and 6, cover 12 further includes a front surface 48 having an inwardly extending rounded portion 50 in which a company logo may be paced. An integrally formed flap or flange extends downwardly from a top rear portion 19 of side wall 14 (see FIG. 6). The flap or flange 52 includes two cutout regions 54a and 54b, two apertures 56a and 56b and two notches 57a,b. A bar 59a,b is formed between respective apertures 56a,b and notches 57a,b. The flap 52 also includes areas of thinned material, such as grooves, 53a–c, forming a hinge portion 53 which enables the cover 12 to pivot thereabout when forced open by the expanding air bag. The cover 12 further includes another integrally formed lower flap 58 extending outwardly from a bottom portion 21 of side wall 14. Flap 58 includes three slots 60 and is configured to pivot along a tear seam 62. An enlarged view of tear seam 62 is shown in FIG. 7.

The housing 24 includes side walls 15a,b and 17a,b. The side walls 17a,b include an integrally formed open cutout 20. During assembly the inflator bolts 104 are positioned in the openings 40a,b and the bolts are slid to one side of the openings so that the inflator end boss 103 resides in and is supported in the cutout 20.

Figure 5:
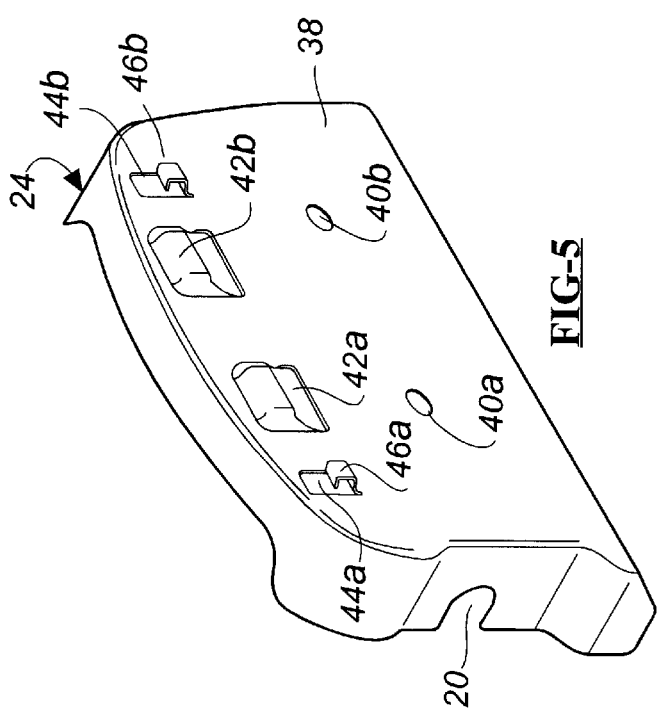
FIG. 5 is a perspective view of the housing of the air bag cover of FIG. 2.

The housing 24 includes features to permit the cover to snap fit thereon and features to enable the housing to be attached to a steering wheel. The attachment features used to secure the cover include two tabular extensions or hooks 46a and 46b (see FIG. 5) and a plurality of tabs 32 (see FIG. 2). The tabular extensions or hooks are formed from the material at a rear surface 38 of the housing. Upon forming the tabs 46a,b two rectangular apertures 44a and 44b are created. The lower tabs 32 extend from a lower surface of the housing 24. More particularly, a lower portion of side wall 15b, generally at 28, extends downwardly to form a sloping surface before leveling off at a walled portion 36. The three rectangular extensions or tabs 32 protrude downwardly from the wall portion 36. The attachment of the cover 12 to the housing is described below.

As mentioned above, the housing 24 includes features enabling the housing, and hence the module 10, to be mounted to a portion of a steering wheel 64. These housing mounting features include a first fastening member such as a threaded throughbore 30 which extends inwardly at 29. The rear surface 38 of housing 24 includes two louvers 42a and 42b (see FIGS. 2 and 5). When the cover 12 is attached to the housing 24 louvers 42a,b extend through and protrude from openings 54a,b of the cover 12. The steering wheel 64 also includes a flange 69. This flange 69 can be formed by the steering wheel frame or by components attached to the steering wheel such as a horn module (not shown). When the module 10 is positioned on the steering wheel 64 the cover flap 58 is sandwiched between the flange 69 and the housing 24. This mounting arrangement holds the flap 58 to the tabs 32.

A method of assembly of the air bag module assembly 10 will now be described. The inflator 102 and the air bag 100 are preferably secured to the housing 24 before the housing and cover are connected to one another. The air bag inflator is secured to the housing 24 by the two bolts 104 which are inserted through the holes 40a and 40b in the rear surface 38 of the housing 24. The two threaded nuts 106 are then threaded to respective bolts to secure the air bag inflator to the housing 24. Prior to attachment of the inflator to the housing the air bag 100 is attached to the inflator in a known manner and thereafter folded about the inflator. The bolts and nuts can be replaced by self-tapping fasteners.

Figure 4:
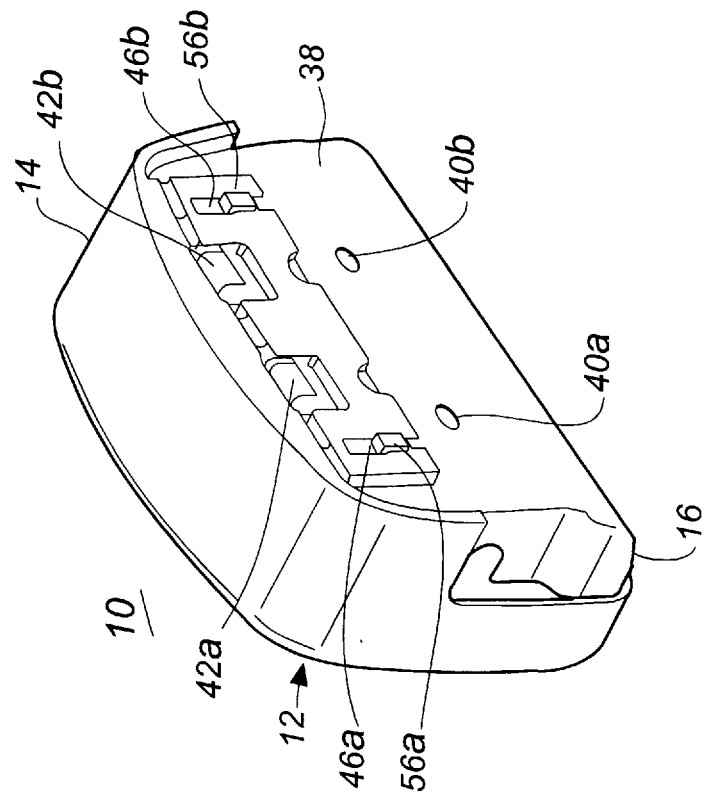
FIG. 4 is a rear view of the air bag module assembly of FIG. 1.

With reference to FIGS. 2 and 4, cover 12 is brought in proximity to housing 24 such that side walls 14 and 16 (of the cover) surround side walls 15 and 17 (of the housing). Flap 52 is lifted outwardly and louvers 42a and 42b are positioned within cutout regions 54a and 54b, respectively. The tabs 46a,b are maneuvered to fit within respective notches 57a,b such that the tabs fit about a respective bar 59a,b. Flap 52 is then pressed against the outside rear surface 38. Flap or flange 58, which extends generally parallel to the housing side wall, is then firmly pressed against lower side wall 15b such that slots 60 matingly engage the three rectangular extensions or tabs 32 protruding from the housing side wall (as mentioned above the flap 58 is maintained in position by the steering wheel flange 69). Thereafter, the hooked tabs 46a,b can be deformed and pressed further against the bar 59a,b and into the openings 56a,b.

Figure 3:
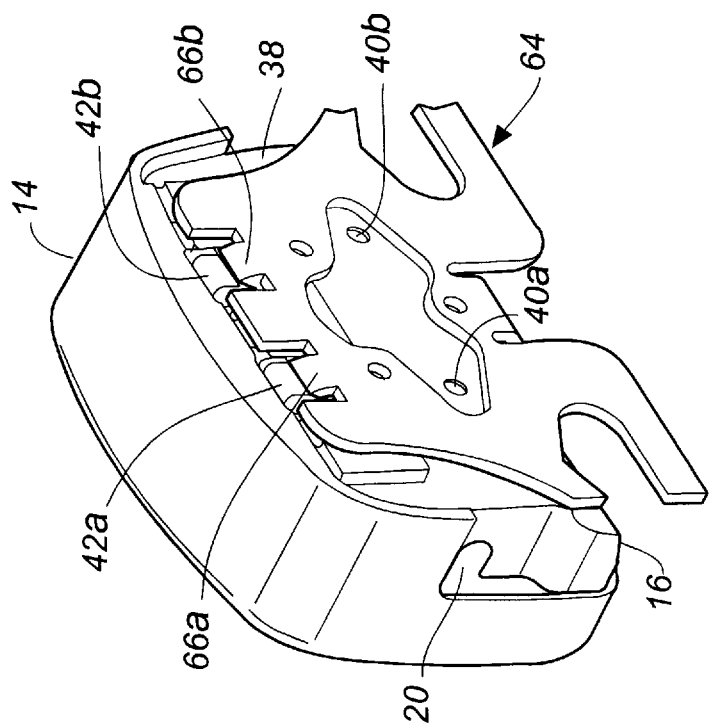
FIG. 3 is a rear view of the air bag module assembly of FIG. 1 connected to the steering wheel frame.

The air bag module 10 of the present invention can be quickly and easily mounted to a steering wheel frame 64 as illustrated by FIGS. 2 and 3. The steering wheel frame 64 includes two extensions 66a and 66b which are inserted into the open mouths of the louvers 42a and 42b to secure the top of the housing 24 to the steering wheel frame 64. A fastening member (such as the threaded throughbore 30 on housing 24) is located to align with a second fastening member (such as a hole) 68 on a forewardly bent tab 70 in steering wheel frame 64. The throughbore 30 can be a threaded hole on the housing or implemented using a hollow threaded insert. Another fastening member such as bolt 72 is inserted through the hole 68 and is threaded within the throughbore 30 to further secure the air bag module 10 to the steering wheel frame 64. As can be appreciated the bolt 72 can be replaced by a snap connector secured to the housing at the locating of the bore 30. The snap fit fastener would engage a complementary sized opening 68 in the wheel frame 64.

Air bag module assembly 10 can still further be secured to the steering wheel frame 64 by the two bolts which are used to secure the air bag inflator to the housing 24. The bolts can be made long enough to be threaded within two throughbores (not shown) in the steering wheel frame 64.

In operation, the inflator in which is stored inflation gas, such as argon, includes an ignitor which when activated causes a frangible disk to break permitting the inflation gas to enter and inflate the air bag within the air bag module assembly 10. As the air bag inflates the tear seam 62 is broken as the air bag presses against the inner side of the cover. Thereafter the cover pivots outwardly about hinge 53 for enabling the air bag to further expand and enter the passenger compartment.

Many changes and modifications in the above-described embodiment of the invention can of course, be carried out without departing from the scope thereof. Accordingly, that scope is intended to be limited only by the scope of the appended claims.

We claim:
1. An air bag module (10) comprising:
a housing (24) having first and second cover fastening features (46a, 32) and at least one mounting feature (42a) which matingly engages at least one cooperating feature (66a) on a steering wheel frame (64) for slidingly mounting the housing to the steering wheel frame (64);
the cover (12) having an inwardly extending outer perimeter forming a side wall (14, 16) to form a cavity (26) in cooperation with the housing for placement of an air bag and inflator therein, the cover (12) having first and second housing engagement members (60, 56a, 57a, 59a) configured to operatively engage the first and second cover fastening features (46a, 32) of the housing (24) to secure the cover and housing to each other.

2. The apparatus of claim 1, wherein the first cover fastening feature on the housing includes at least one tab (32) extending from a lower portion of the housing (24) and wherein the cover (12) includes a first flap (58) connected to a lower portion of the side wall (14) and wherein the first housing engagement member on the cover includes at least one slot (60) engageable with the at least one tab (32) and tear seam (62) portion for releasably engaging the flap (58) with the housing (24), the tear seam breaking upon initial inflation of the air bag.

3. The apparatus of claim 1, wherein the second cover fastening feature (46a), of the housing, includes a tabular extension (46a) protruding outwardly from a rear surface (38) of the housing (24).

4. The apparatus of claim 1, wherein the second housing engagement member (56a) of the cover includes an aperture (56a, 57a) and bar (59a) on a second flap (52), the flap (52) extending perpendicularly from the wall portion (14) and generally parallel to a rear surface of the housing to align the aperture (56a, 57a) with the second cover fastening feature (46a), the second flap (52) including a hinge portion (53) to permit the cover (12) to rotate thereabout subsequent to the breaking of the tear seam.

5. The apparatus as defined in claim 4 wherein the second cover fastening feature includes a hook (46a) received about the bar (59a).

6. The apparatus as defined in claim 1 wherein the mounting feature on the housing includes a plurality of open louvers (42a,b) for receiving a corresponding tab or projection of the steering wheel.

7. The apparatus as defined in claim 1 wherein the louvers (42a,b) extend through openings (54a,b) in the second flap (52).

8. The apparatus of claim 7, wherein the cover fastening feature (46a) is a tabular extension (46a) protruding outwardly from a rear surface (38) of the housing (24).

9. The apparatus of claim 7, wherein the at least one engagement member (56a) is an aperture (56a) on a second flap (52), the second flap (52) extending perpendicularly from the side wall (14) to align the aperture (56a) with the at least one fastening feature (46a).

10. An air bag module assembly (10) comprising:

a housing (24) having at least one cover fastening feature (46a);

a cover (12) having an inwardly extending outer perimeter forming a side wall (14) and at least one housing engagement member (56a) configured to engage with the at least covering fastening feature (46a);

an air bag and inflator within the cavity and secured to the housing (24), the air bag inflatable in response to inflation gas provided by an inflator, the at least one housing engagement member (56a) being joined to the at least one cover fastening feature (46a) to secure the housing (24) to the cover (12), the housing (24) including first mounting means including at least one louver (42a) for matingly engaging at least one extension (66a) on a steering wheel (64) for securing said air bag module assembly to said steering wheel frame (64).

11. The apparatus of claim 10, wherein said housing (24) includes second mounting means for securing the housing to the steering wheel.

12. The apparatus as defined in claim 11 wherein the second mounting means includes a throughbore (30) and hole (68) on the steering wheel, the throughbore (30) configured to align with the hole (68), in a steering wheel frame (64), for receiving a fastener (72) for further securing the air bag module to the steering wheel (64).

13. The apparatus of claim 11, wherein said housing (24) is constructed from a metallic alloy or plastic.

14. The apparatus of claim 11, wherein said cover (12) is constructed from a thermoplastic material.

15. The apparatus of claim 10, wherein said cover (12) includes a first flap (58) connected to the side wall (14) and having at least one slot (60) for releasably engaging at least one extension (32) extending from the perimeter of the housing (24) to further secure the cover and housing to each other, the at least one extension (32) and first flap (58) configured to disengage when the air bag inflates.

16. An improved air bag module (10) of the type having a housing (24) configured to engage a cover (12) to form a cavity therebetween for placement of an air bag and inflator therein, the improvement comprising:

at least one connector (46a) on said housing (24) configured to engage at least one engagement member (56a) on said cover (12), said at least one connector (46a) and said at least one engagement member (56a) being integrally formed one of the cover and the housing.

17. The apparatus of claim 16, wherein said at least one connector (46a) is a tabular extension (46a) protruding outwardly from a rear surface (38) of said housing (24).

18. A method of assembling an air bag module assembly (10), the method comprising the steps of:

providing a housing (24) having at least one fastening feature (46a) for engaging a cover (12) having an inwardly extending side wall (14) along a perimeter thereof and means for engaging the at least one fastening feature;

securing an air bag module to the housing;

bringing the housing (24) in proximity to the cover (12) such that the side wall (14) surrounds the housing (24) to form a cavity between the cover and the housing of said air bag and inflator therein; and facilitating the at least one fastening feature (46a) to engage the means for engaging the at least one connector.

* * * * *